Oct. 8, 1963 H. FRENK ETAL 3,106,129
ARRANGEMENT FOR MEASURING EXPOSURE TIME
Filed July 17, 1961 3 Sheets-Sheet 2

INVENTORS
HELMUTH FRENK
KLAUS WEBER
By Toulmin & Toulmin
Attorneys

Oct. 8, 1963  H. FRENK ETAL  3,106,129
ARRANGEMENT FOR MEASURING EXPOSURE TIME
Filed July 17, 1961  3 Sheets-Sheet 3

INVENTORS
HELMUTH FRENK
KLAUS WEBER

By Toulmin & Toulmin
Attorneys 3,106,129
ARRANGEMENT FOR MEASURING
EXPOSURE TIME
Helmuth Frenk and Klaus Weber, Wetzlar (Lahn), Germany, assignors to Ernst Leitz Gesellschaft mit beschrankter Haftung, Wetzlar, Germany
Filed July 17, 1961, Ser. No. 124,486
Claims priority, application Germany July 20, 1960
11 Claims. (Cl. 88—24)

The present invention relates to an arrangement for measuring exposure time, more particularly, to an improved arrangement for accurately measuring the exposure time in photomicrography regardless of the area of the image field.

In an apparatus particularly adapted for photomicrography it is known to use a photomultiplier as a light-sensitive element for measuring the exposure time of the film. This photomultiplier operates to integrate the total illumination of the entire image field so as to indicate a particular exposure time. This arrangement is satisfactory and has no drawbacks if the essential details of the object to be photographed cover the entire image field. However, in those instances where the object to be photographed covers but a fraction of the image field, the measuring of exposure time by the aforementioned arrangement will lead to inaccurate results. These inaccurate measurements will be particularly apparent when the background of the object to be photographed is dark.

It is therefore the principal object of this invention to provide a novel and improved arrangement for accurately measuring the exposure time in photomicrography apparatus regardless of the area of the image field.

The present invention essentially comprises optical means in the path of the light which is to be measured which means functions to restrict or limit the measuring field of the image. In addition, optical means are provided which vary the measured result of the light measuring means inversely proportional with respect to the area of the measured field so that with equal illumination from a light source, the light flux impinging on the photoelectric cell remains constant regardless of the adjustment of the means for limiting the measured field of the image. For example, if only two diaphragm apertuers are used, then a filter is mounted on the larger aperture to reduce the light flux passing therethrough to a point when this light flux will be equal to the light flux passing through the smaller aperture which has no filter, or has a filter having 0 absorption.

One embodiment of the present invention comprises a diaphragm positioned in the path of the light which is to be measured. This diaphragm is of a type which is adjustable to several definite opening sizes. In addition, means are provided for varying the illumination received by the light measuring arrangement or the sensitivity of the light measuring arrangement to correspond to the adjusted opening of the diaphragm. The image field is limited for the purpose of measuring the light illumination by means of the diaphragm. Accordingly, the light is integrated only over said small area which includes the object which is to be photographed.

The diaphragm may be of a type which has a plurality of definite openings or may be continuously variable. In addition, means can be provided at the ocular of the microscope to indicate the adjusted opening of the diaphragm.

In another embodiment of the invention light filter plates are used having a variable transparency, for example, gray or neutral wedge disks or polarizing filter disks. This transperency is formed so as to vary with respect to the adjusted openings of the diaphragm. By providing a light source of constant illumination the photoelectric cell of the light measuring means will always receive an intensity of illumination which is independent of the adjusted opening of the diaphragm.

In addition, at least one colored filter can be arranged in series or in alignment with the adjustable diaphragm in order to very the spectral sensitivity of the photomultiplier. Also a diffusing lens or a field lens may be arranged in series with the diaphragm to provide for the uniform illumination of a large area of the photomultiplier when the diaphragm is adjusted to a small size opening. Since different portions of photo electrical cell of the multiplier have different sensitivities, the use of the diffuser will ensure correct measuring results even though a small diaphragm opening is employed.

Other objects and advantages of this invention will be apparent upon reference to the accompanying description when taken in conjunction with the following drawings wherein.

A specific embodiment and several modifications of the present invention will next be described in detail with reference to the above mentioned drawings wherein like reference symbols indicate the same parts throughout the various views.

Figure 1:
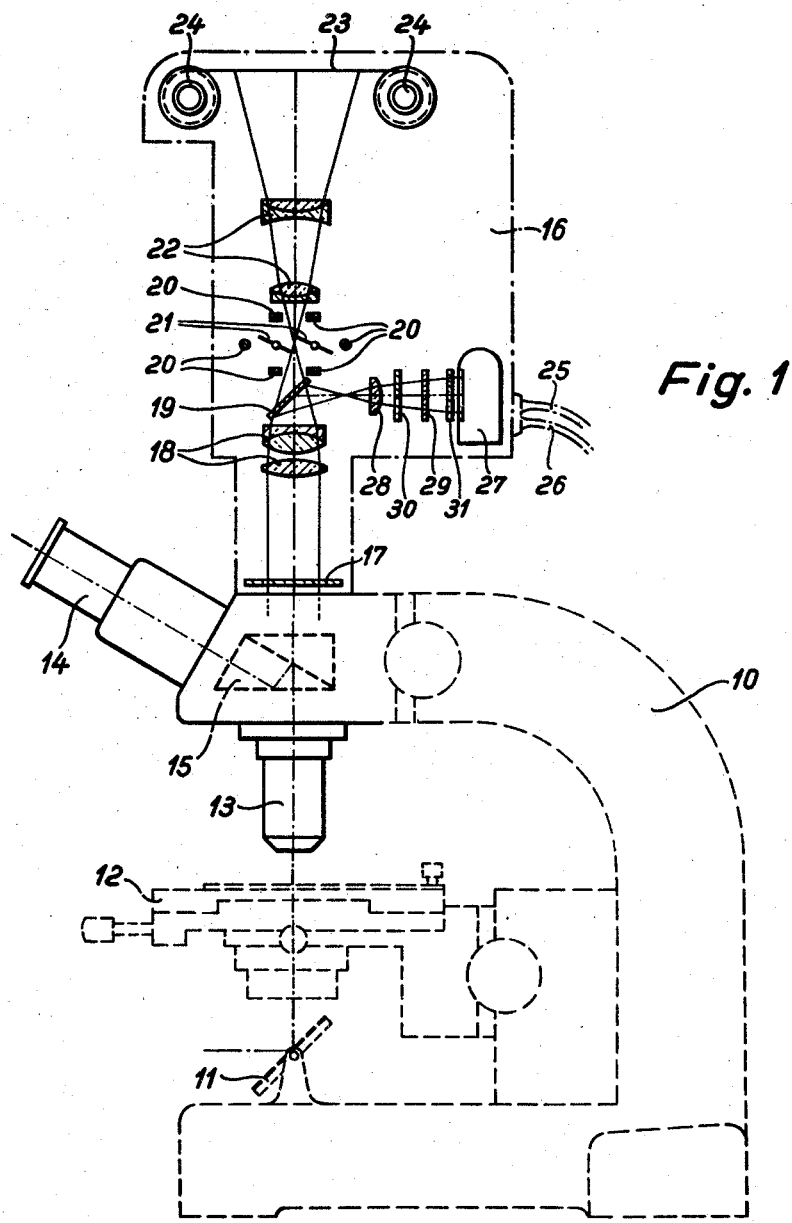
FIGURE 1 is a schematic elevational view of a time exposure measuring arrangement in a photomicrography instrument.

In FIGURE 1 there is indicated in outline form a microscope 10 comprising a reflector 11, a stage 12, an objective 13, and an eyepiece 14.

Positioned in series with the objective 13 is a divider prism 15 which permits approximately ⅘ of the light received through the objective to pass into a camera indicated as 16.

The camera comprises a stop plate 17 arranged in series or in alignment with an ocular lens 18 and is positioned in the path of the light rays entering the camera for the purpose of protecting the interior of the camera from foreign bodies.

A divider plate 19 is mounted behind the lens 18 and reflects a portion of the light received through the lens 18 laterally therefrom for the purpose of measuring the exposure time.

Electromagnets 20 operate a shutter 21 which is of the Venetian blind type.

Positioned behind the shutter and electromagnets is an objective 22 through which the light passes upon a film 23 supported on reels 24. Electric cables 25 and 26 connect a photomultiplier 27 as well as the shutter control electromagnets 20 with a suitable control device which is not illustrated nor further described in detail.

The light which is split off by the plate 19 and is to be used for measuring the exposure time passes through a lens 28, through the aperture of a diaphragm arrangement 29 to impinge on the cathode of the photomultiplier 27. A colored light filter 30 is arranged in the path of the light to be measured in series with the diaphragm arrangement 29. This filter adapts the spectral sensitivity of the photomultiplier to that of the selenium element, as used in a light meter, since the references to sensitivity found on most commercial films are based upon a selenium element.

A diffusing plate or lens 31 is also arranged in series with the diaphragm arrangement 29. This diffusing plate provides for uniform illumination of a large area of the photomultiplier particularly in the case when a small diaphragm opening is used. Without such a diffusing plate only a portion of the cathode of the photomultiplier would be illuminated when a small diaphragm opening is used. Since the sensitivity of this illuminated part of the cathode would differ from the remaining cathode surface it is apparent that incorrect measurements of the light would result.

Figure 2:
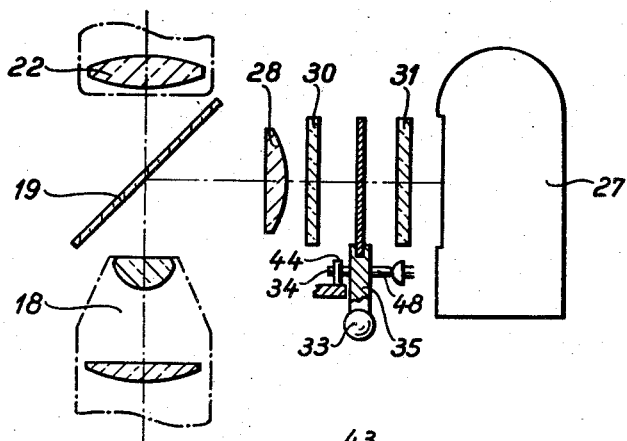
FIGURE 2 is a schematic elevational view of a portion of FIGURE 1 and showing the arrangement of the components comprising the present invention.
Figure 3:
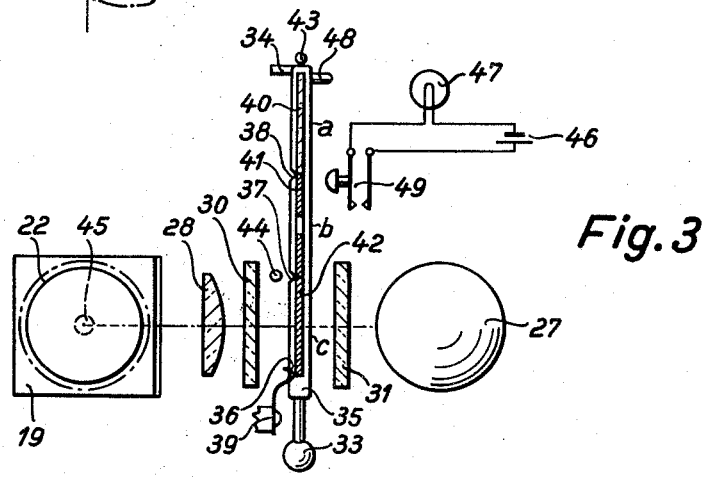
FIGURE 3 is a top plan view of the arrangement as illustrated in FIGURE 2.
Figure 4:
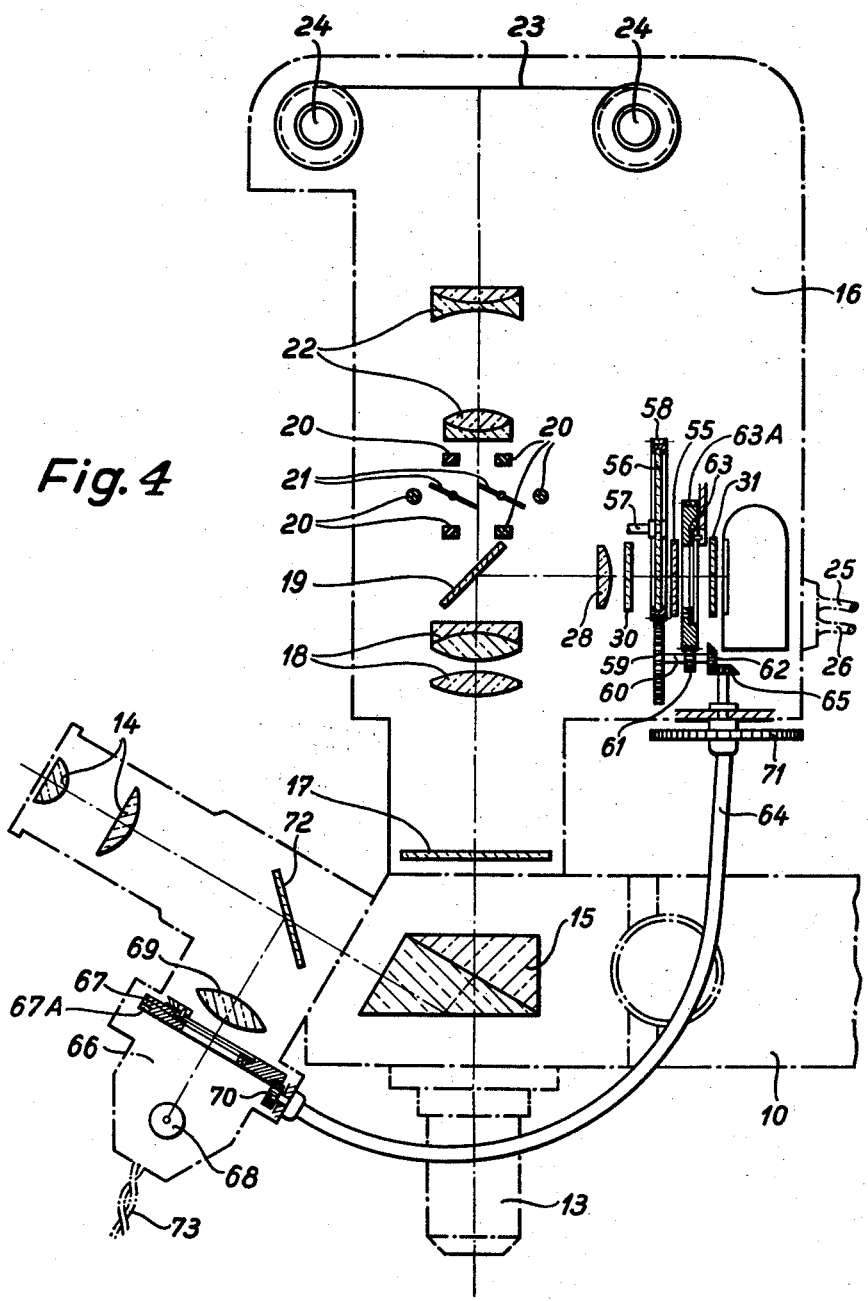
FIGURE 4 is a view similar to that of FIGURE 1 showing a further modification of this present invention.

Proceeding to FIGURE 2 the elements comprising this invention are illustrated in greater detail. In order to properly illustrate the relationship of these elements with respect to the remainder of the camera the microscope ocular 18 and the objective 22 are also illustrated. FIGURE 3 is a top plan view of the elements as illustrated in FIGURE 2.

The adjustable diaphragm which is indicated as 29 in FIGURE 1 comprises a slidably mounted frame 35 comprising an operating knob or handle 33 and a laterally extending projection 34 which cooperates with stops or abutments 43 and 44 to limit the path of movement of the diaphragm. The slidable frame 35 has three lateral recesses 36, 37, and 38 which cooperate with a fixedly mounted spring arm 39 to accurately secure the sliding frame in each of its adjusted positions. In addition, the snapping or clicking of the spring as it engages one of the recesses indicates to the operator of the arrangement that one of the diaphragms of the slidable frame is in the operating position.

The slidable frame 35 comprises three separate areas or sectors $a$, $b$, and $c$. Sector $a$ is provided with a grey filter 40 having a predetermined transparency and permits the passage of the entire image field. Sector $b$ is provided with a diaphragm 41 which has a small aperture therein which permits the illumination only of those portions of the image field when relatively small objects are to be photographed. The light permeability or transparency of the grey or neutral filter 40 with respect to the aperture of the diaphragm 41 is so selected that even without an objective equal light intensities will impinge on the photomultiplier through the sectors $a$ and $b$.

Sector $c$ comprises a shutter plate 42. It is used to protect the photomultiplier when the instrument is initially switched on.

The microscope used in this arrangement is provided with an adjustable cross table or sliding table which is conventional. The use of this table permits the necessary movement and adjustment of the object to be photographed when small diaphragm openings are used.

A marking 45 is made on the observation ocular which permits an accurate positioning of the object to be photographed with respect to the aperture of the diaphragm 41. This marking can also be produced by a corresponding imaging. For this purpose the ocular can be provided with an electric lamp 47 fed through a suitable source of electrical energy 46. The illumination of the lamp 47 is controlled by a switch 49 actuated by means of a cam 48 fixed on the slidable frame 35.

The slidable frame 35 may also be provided with diaphragms having at least two different sized apertures which are used with correspondingly graded grey or neutral filters. If desired, the indication of the sensitivity of the film can also be varied automatically instead of using filters of variable transparence.

The embodiments of the invention as described above all include diaphragms having rigid or defined apertures. These diaphragms, however, can be replaced by a continuously variable diaphragm such as an iris diaphragm. This diaphragm would be coupled with a filter which also has a continuously variable light permeability or transparency. Such an arrangement is illustrated in FIGURE 5 which shows the use of a continuously variable diaphragm.

That portion of the light which is split off by the plate 19 and is to be reflected on the light measuring means passes through a lens 28 which is arranged in series with a colored filer 30. Also in series behind the filter 30 are two neutral or grey wedge plates 55 and 56 which are positioned as filters. These plates are of the type whose light permeability or transparency varies gradually about their periphery. The plate 55 is fixedly mounted and functions in the manner known per se as a compensation plate. The wedge plate 56, however, is pivotly mounted upon a shaft 57 and is provided at its periphery with a gear 58 which meshes with a gear 59. The gear 59 is fixed upon a rotatably mounted shaft 60 upon which are also mounted two other gears 61 and 62. The gear 61 is of the spur type and actuates an iris diaphragm 63 through a ring gear 63A mounted on the periphery thereof. The diaphragm 63 is positioned in the path of the light to be measured and is arranged in series with the diffusing plate or lens 31.

The gear 62 is of the bevel type and meshes with another bevel gear 65 mounted on the end of a flexible shaft 64.

The portion of the microscope comprising the eyepiece 14 has a lateral projection 66 within which is mounted an auxiliary diaphragm 67, a lamp 68 functioning as a source of illumination and a lens 69. The diaphragm 67 is provided with a gear 67A which meshes with a gear 70 which in turn is fixed upon the other end of the flexible shaft 64. A handwheel 71 is mounted on the flexible shaft 64 and serves as the actuating means for adjusting the diaphragms 63 and 67.

The lamp 68 can be made colored if desired in order to increase the contrast thereof with the object to be photographed. The light from this lamp is conducted into the ocular by means of a reflecting plate 72 after having passed through the diaphragm 67 and the lens 69. The lamp 68 is connected with a suitable voltage source through a wire 73.

The lamp 68 can be switched on either manually or automatically when the diaphragm begins to close. A suitable control mechanism may be mounted on one of the diaphragms to actuate this lamp switch. In addition, the operator when looking through the eyepiece 14 will see an indication of the size of the diaphragm opening reflected on the plate 72 by the diaphragm 67. The diaphragm 67, being directly connected with the diaphragm 63, will give an accurate indication of the size of the opening of the diaphragm 63.

It is pointed out that the grey or neutral filters 55 and 56 can be replaced by polarizing filters. In this event, however, the actuation of the filters with respect to the diaphragm opening must be accomplished by a properly designed cam plate, since the closing of the iris diaphragm as a function of the angle of rotation varies differently than the reduction in absorption of two polarizing filters as a function of the angle of rotation.

Thus it can be seen that the present invention provides a novel and simplified arrangement for adjusting the exposure time with respect to the size of the object which is to be photographed. The arrangement can be constructed so as to provide either a few predetermined values of diaphragm openings or an infinite number of diaphragm openings to the use of an iris diaphragm. The actual construction employed will depend upon the specific applications of this arrangement.

It will be understod that this invention is susceptible to modification in order to adapt it to different usages and conditions and, accordingly, it is desired to comprehend such modifications within this invention as may fall within the scope of the appended claims.

What is claimed in this invention is:

1. In an arrangement for photomicrography, the combination of a lens system receiving light from an object to be photographed, means for continuously measuring a portion of the light received through said lens system, an adjustable diaphragm in the path of the light to be measured for selecting a defined area of the image field of the object to be photographed, and optical means in the path of the light to be measured for varying the intensity of said light inversely proportional to the area of the selected image field.

2. In an arrangement for photomicrography, the combination of means for continuously measuring a portion of the light received through an objective of a camera, and adjustable diaphragm in the path of the light to be measured for selecting a defined area of the image field of the object to be photographed, and optical means in the path of the light to be measured for varying the intensity of said light inversely proportional to the area of the selected image field.

3. In an arrangement for photomicrography, the combination of a lens system receiving light from an object to the photographed, means for continuously measuring a portion of the light received through said lens system, an adjustable diaphragm in the path of the light to be measured for selecting a defined area of the image field of the object to be photographed, and optical means for modifying the sensitivity of said light measuring means with respect to the adjusted opening of a said diaphragm so as to vary the intensity of said light inversely proportional to the area of the selected image field.

4. In an arrangement for photomicrography, the combination of an observation microscope for viewing an object and having an eyepiece thereon, a lens system receiving light to be photographed, means for continuously measuring a portion of the light received through said lens system, an adjustable diaphragm in the path of the light to be measured for selecting a defined area of the image field of the object to be photographed, means on the eyepiece of said microscope for indicating the adjusted position of said diaphragm, and optical means in the path of the light to be measured for varying the intensity of said light inversely proportional to the area of the selected image field.

5. In an arrangement for photomicrography, the combination of a lens system receiving light from an object to be photographed, means for continuously measuring a portion of the light received through said lens system, an adjustable diaphragm in the path of the light to be measured for selecting a defined area of the image field of the object to be photographed, a plurality of filters adapted to be selectively interposed in the path of the light to be measured, and means for selectively positioning one of said filters for all adjusted openings of the diaphragm except the smallest in the path of the light to be measured so that from a light source of constant light intensity the illumination of said light measuring means will be constant for adjusted positions of said diaphragm.

6. In an arrangement for photomicrography, the combination of a lens system receiving light from an object to be photographed, means for measuring a portion of the light received through said lens system, a continuously variable adjustable diaphragm in the path of the light to be measured for regulating this light so that the area of the measured field of the object is varied, a light filter having a continuously variable degree of transparency arranged in alignment with said diaphragm, and means for positioning said filter to correspond to the adjusted opening in said diaphragm.

7. In an arrangement for photomicrography, the combination of an observation microscope for viewing an object and having an eyepiece thereon, a light source in said microscope, a lens system receiving light from an object to be photographed, means for measuring a portion of the light received through said lens system, a continuously variable adjustable diaphragm in the path of the light to be measured for regulating this light so that the area of the measured field of the object is varied, a light filter having a continuously variable degree of transparency arranged in series with said diaphragm, an auxiliary diaphragm in said microscope to vary the illumination from said light source, and means interconnecting said diaphragm and said auxiliary diaphragm and said filter for concurrently adjusting the diaphragm openings to correspond with the adjusted position of said filter.

8. In an arrangement for photomicrography, the combination of a lens system receiving light from an object to be photographed, means for measuring a portion of the light received through said lens system, a continuously variable adjustable diaphragm in the path of the light to be measured for regulating this light so that the area of the measured field of the object is varied, a light filter having a continuously variable degree of transparency arranged in series in said diaphragm, and means for positioning said filter to correspond to the adjusted opening in said diaphragm, and means on said adjustable diaphragm for actuating an electric control circuit.

9. In an arrangement for photomicrography, the combination of a lens system receiving light from an object to be photographed, means for continuously measuring a portion of the light received through said lens system, an adjustable diaphragm in the path of the light to be measured for regulating this light so that the area of the image field of the object to be photographed is varied, and a colored filter in alignment with said adjustable diaphragm in the path of the light to be measured for varying said light measuring means inversely proportional to the area of the image field.

10. In an arrangement for photomicrography, the combination of a lens system receiving light from an object to be photographed, means for continuously measuring a portion of the light received through said lens system, an adjustable diaphragm in the path of the light to be measured for regulating this light so that the area of the image field of the object to be photographed is varied, and a diffuser plate in alignment with said diaphragm in the path of the light to be measured for uniformly distributing the light into said light measuring means, and means in the path of the light to be measured for varying said light measuring means inversely proportional to the area of the image field.

11. In an arrangement for photomicrography, the combination of an observation microscope having an eyepiece thereon, a lens system receiving light from an object to be photographed, means for measuring a portion of the light received through said lens system, an adjustable diaphragm in the path of the light to be measured for regulating this light so that the area of the measured field of the object is varied, means on the eyepiece of said microscope for indicating the adjusted position of said diaphragm, a light source in said microscope for illuminating said indicating means, and means in the path of the light to be measured for varying said light measuring means inversely proportional to the area of the measured field.

References Cited in the file of this patent

UNITED STATES PATENTS

| 2,501,365 | Varden | Mar. 21, 1950 |
| 2,651,969 | Thor | Sept. 15, 1953 |
| 2,687,670 | Locquin | Aug. 31, 1954 |
| 2,764,060 | Horak | Sept. 25, 1956 |